(12) United States Patent
Zhou et al.

(10) Patent No.: US 10,175,545 B2
(45) Date of Patent: Jan. 8, 2019

(54) BACKLIGHT MODULE AND LIQUID CRYSTAL DISPLAY DEVICE

(71) Applicant: Wuhan China Star Optoelectronics Technology Co., Ltd., Wuhan, Hubei (CN)

(72) Inventors: Yaling Zhou, Guangdong (CN); Zhou Zhang, Guangdong (CN); Yu-Cheng Tsai, Guangdong (CN); Changwen Ma, Guangdong (CN); Pan Xu, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 0 days.

(21) Appl. No.: 15/558,148

(22) PCT Filed: Jun. 13, 2017

(86) PCT No.: PCT/CN2017/088025
§ 371 (c)(1),
(2) Date: Sep. 13, 2017

(65) Prior Publication Data
US 2018/0307081 A1    Oct. 25, 2018

(30) Foreign Application Priority Data

Apr. 25, 2017    (CN) .......................... 2017 1 0277673

(51) Int. Cl.
*G02F 1/1345* (2006.01)
*G02F 1/133* (2006.01)
*G02F 1/13357* (2006.01)

(52) U.S. Cl.
CPC ........ *G02F 1/13452* (2013.01); *G02F 1/1336* (2013.01); *G02F 1/13306* (2013.01); *G02F 1/13458* (2013.01)

(58) Field of Classification Search
CPC .................................................. G02F 1/13452
See application file for complete search history.

(56) References Cited

U.S. PATENT DOCUMENTS 5,838,400 A * 11/1998 Ueda ................. G02F 1/133604
    349/58
6,342,932 B1 * 1/2002 Terao .................. G02F 1/13452
    349/150

(Continued)

FOREIGN PATENT DOCUMENTS

| CN | 201773244 U | 3/2011 |
| KR | 1020100001546 A | 1/2010 |

*Primary Examiner* — Sang V Nguyen
(74) *Attorney, Agent, or Firm* — Andrew C. Cheng

(57) ABSTRACT

The present application discloses a backlight module and a liquid crystal display device, the backlight module includes a first connecting terminal disposed on the backlight module for connecting the liquid crystal panel; a second connecting terminal disposed on the backlight module for connecting the control circuit board; a processing circuit is formed on one side of the backlight module to connect to the first connecting terminal and the second connecting terminal, respectively, and for realizing the signal processing and the connection between the liquid crystal panel and the control circuit board. The application can eliminate the conventional FPCA and reducing the thickness and weight of the liquid crystal display device.

16 Claims, 4 Drawing Sheets

(56) References Cited

U.S. PATENT DOCUMENTS

| | | | |
|---|---|---|---|
| 6,466,195 B1 * | 10/2002 | Hashimoto | G02B 6/0086 345/102 |
| 2001/0010569 A1 * | 8/2001 | Jin | G02F 1/133308 349/58 |
| 2002/0089493 A1 | 7/2002 | Hong | |
| 2003/0117543 A1 * | 6/2003 | Chang | G02F 1/13452 349/58 |
| 2005/0088830 A1 * | 4/2005 | Yumoto | G02F 1/13452 361/749 |
| 2008/0192420 A1 * | 8/2008 | Imajo | G02F 1/13452 361/679.02 |
| 2009/0073370 A1 | 3/2009 | Kondo et al. | |
| 2014/0176863 A1 * | 6/2014 | Oohira | G02B 6/0088 349/62 |
| 2017/0374740 A1 * | 12/2017 | Yamaguchi | G02F 1/1333 |
| 2018/0113349 A1 * | 4/2018 | Arita | G02F 1/13452 |

* cited by examiner

BACKLIGHT MODULE AND LIQUID CRYSTAL DISPLAY DEVICE

FIELD OF THE INVENTION

The present application relates to a liquid crystal display technology field, and more particularly to a backlight module and liquid crystal display device.

BACKGROUND OF THE INVENTION

With the rapid development of various electronic products, thinner and lightweight become an important criterion for judging electronic products. The production of existing electronic products, the thickness and weight of the entire electronic products is reduced mainly by reducing the thickness and weight of the liquid crystal display panel or backlight module.

Referring to FIGS. 1 and 2, during a long period of development and research of the inventors of the present application, it have been found that the connection of the control circuit board 300 and the liquid crystal panel 200 is needed to through electronic components. At present, by integrating the electronic components on the FPC to form a FPCA400 (flexible printed circuit board assembly), and by using FPCA400 to realize the connection between the control circuit board 300 and the liquid crystal panel 200, so that the FPCA400 has a certain thickness and area to carry the electronic components. A backlight module 100 is provided between the control circuit board 300 and the liquid crystal panel 200, and the FPCA400 is required to cross the backlight module 100, so that the FPCA400 has a certain length. The FPCA400 occupies too much volume and weight, is not conducive to the realization of the thinning and lighting of the electronic products.

SUMMARY OF THE INVENTION

A technical problem to be solved by the present application is to provide a backlight module and a liquid crystal display device, thereby eliminating the conventional FPCA and reducing the thickness and weight of the liquid crystal display device.

In order to solve the above technical problems, a technical aspect of the present application is to provide a backlight module including:

a first connecting terminal disposed on the backlight module for connecting the liquid crystal panel;

a second connecting terminal disposed on the backlight module for connecting the control circuit board;

a processing circuit formed on one side of the backlight module to connect to the first connecting terminal and the second connecting terminal, respectively, and for realizing the signal processing and the connection between the liquid crystal panel and the control circuit board.

In order to solve the above technical problems, another technical aspect of the present application is to provide a liquid crystal display device including:

a liquid crystal panel;

a control circuit board;

a backlight module including a first connecting terminal disposed on the backlight module, for connecting the liquid crystal panel; a second connecting terminal disposed on the backlight module, for connecting the control circuit board; a processing circuit formed on one side of the backlight module, and connecting to the first connecting terminal and the second connecting terminal respectively, for realizing the signal processing and the connection between the liquid crystal panel and the control circuit board.

The processing circuit for connecting the liquid crystal panel and the control circuit board formed on FPCA previously, is disposed on the backlight module in the embodiment of the present application, to improve the production efficiency of the processing circuit and reduce the cost, while eliminating the conventional FPCA and reducing the thickness and weight of the liquid crystal display device.

BRIEF DESCRIPTION OF THE DRAWINGS

In order to more clearly illustrate the embodiments of the present application or prior art, the following FIG.s will be described in the embodiments are briefly introduced. It is obvious that the drawings are merely some embodiments of the present application, those of ordinary skill in this field can obtain other FIG.s according to these FIG.s without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention. Embodiments and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 1:
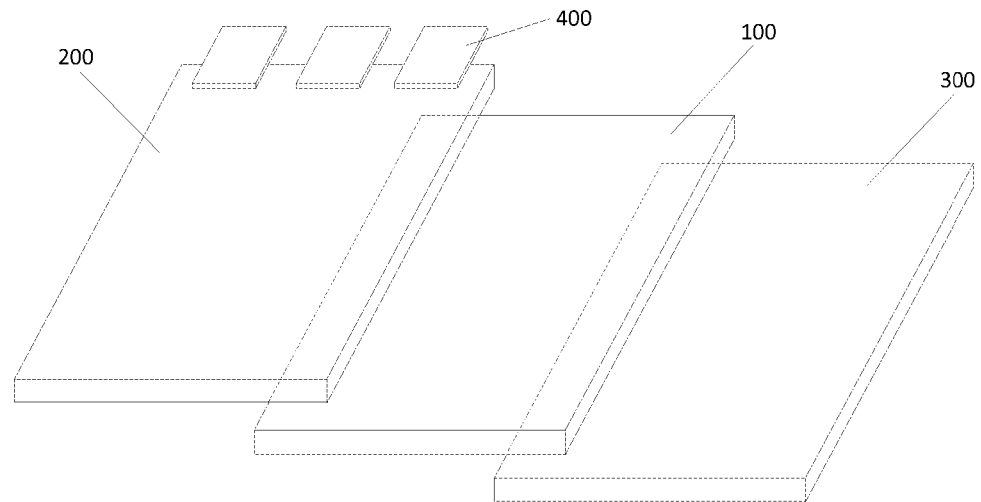
FIG. 1 is an exploded stereoscopic perspective view of a liquid crystal display device in the conventional technology.
Figure 2:
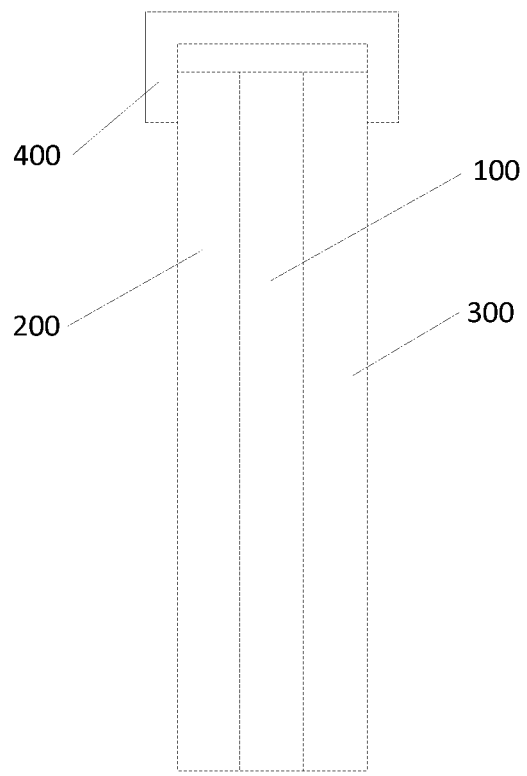
FIG. 2 is a schematic plan view of the liquid crystal display device in the conventional technology.
Figure 3:
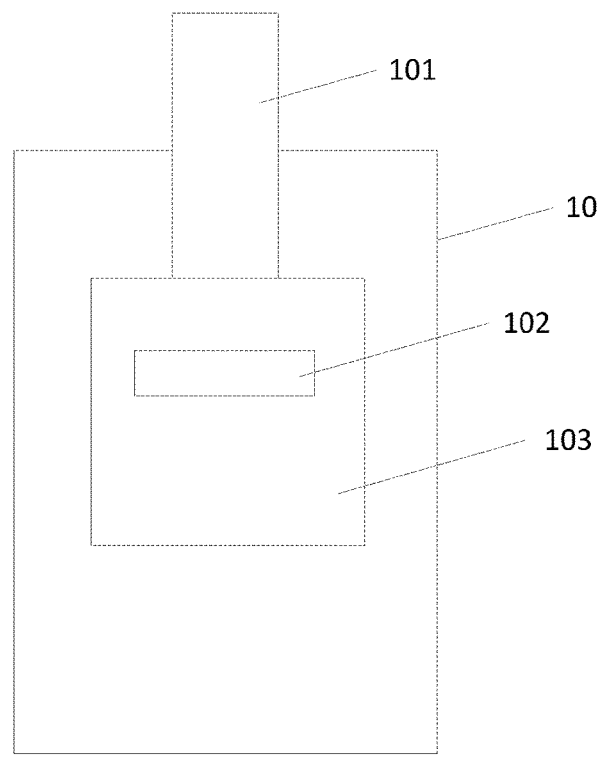
FIG. 3 is a schematic structural view of an embodiment of the backlight module of the present application.
Figure 4:
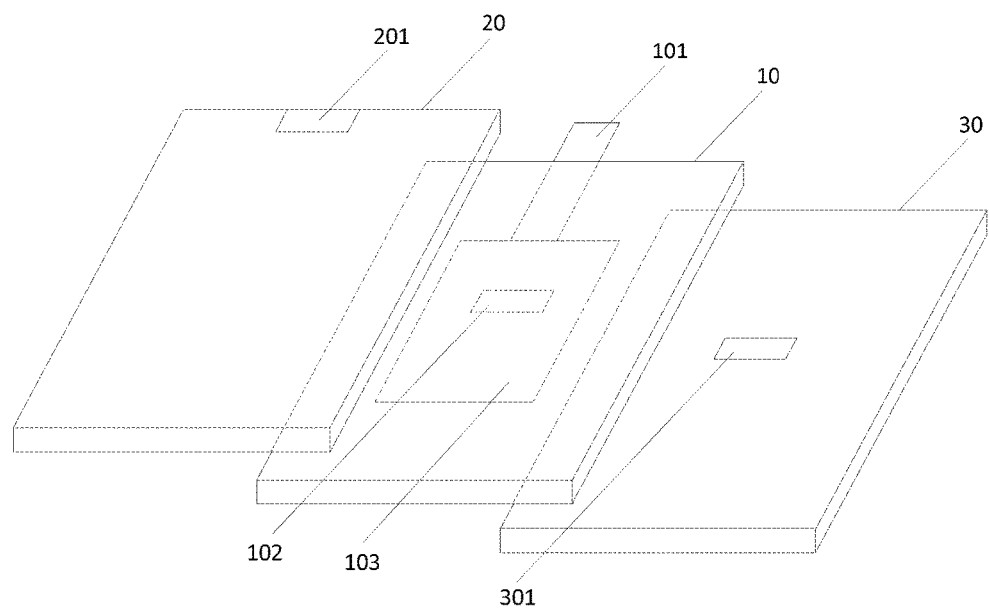
FIG. 4 is an exploded stereoscopic perspective view of an embodiment of the liquid crystal display device of the present application.
Figure 5:
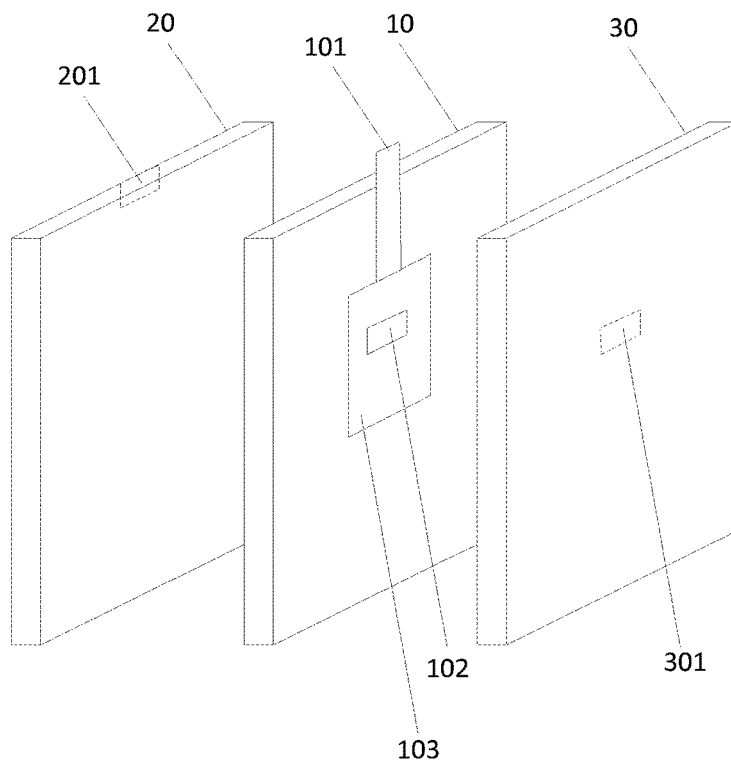
FIG. 5 is an exploded stereoscopic side view of an embodiment of the liquid crystal display device of the present application.
Figure 6:
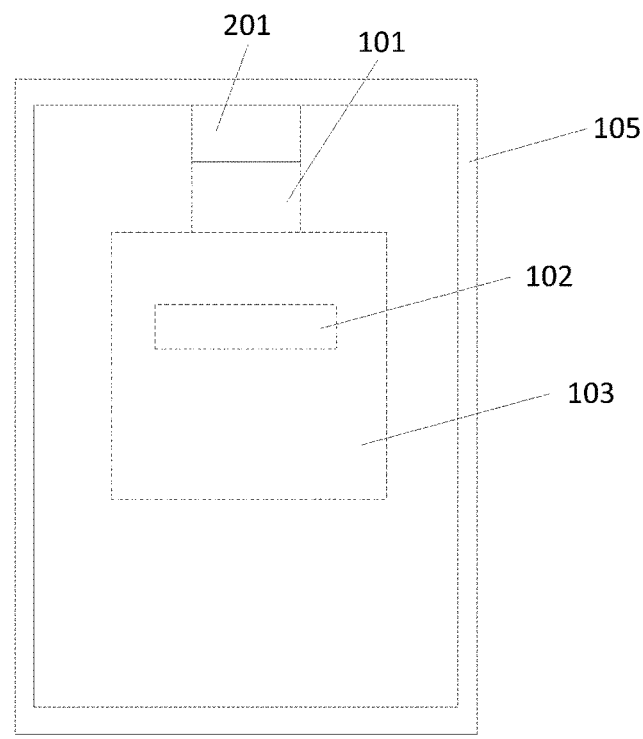
FIG. 6 is a schematic plan view of a liquid crystal display device according to an embodiment of the present application.
Figure 7:
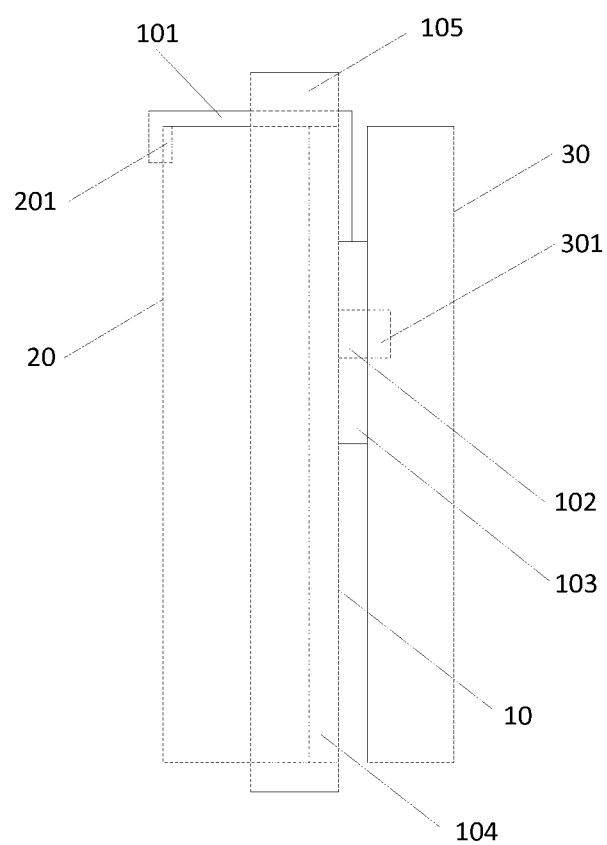
FIG. 7 is a schematic plan view of a liquid crystal display device according to an embodiment of the present application.

Referring to FIG. 3, the backlight module embodiment of the present application includes:

A first connecting terminal 101, disposed on the backlight module 10 for connecting the liquid crystal panel;

A second connecting terminal 102, disposed on the backlight module 10 for connecting the control circuit board, A processing circuit 103 formed on one side of the backlight module 10 to connect to the first connecting terminal 101 and the second connecting terminal 102, respectively, for realizing the signal processing and the connection between the liquid crystal panel and the control circuit board.

The processing circuit 103 can include a photoelectric conversion circuit or a voltage, a current control circuit, and the like. The liquid crystal panel can include a driving IC (integrated circuit), a polarizer, a filter, a touch panel, and the like. The control circuit board can include a control circuit, a processing circuit and a power source.

Alternatively, the control circuit board transmits the control signal to the processing circuit 103 through the second connecting terminal 102, after the processing of the processing circuit 103, and transmits the control signal to the liquid crystal panel through the first connecting terminal 101 to control the backlight module 10 to generate the outputting of the light. The processing circuit 103 can also realize the transmitting of other signals such as an induction signal.

Alternatively, the processing circuit 103 is formed on one side of the backlight module 10 by a 3D printing technique. The processing circuit 103 formed by 3D printing has the advantages of high accuracy and low cost, and the printing cycle of the processing circuit 103 is short and the production efficiency is high. Of course, the processing circuit 103 can be formed on the backlight module 10 in other ways, for example, by transferring the corresponding circuits on the side of the backlight module and welding the corresponding elements on the transferred circuits to form the processing circuit 103.

Alternatively, the second connecting terminal 102 is a pad built in the side surface or provided on the side surface of the backlight module 10. For example, the second connecting terminal 102 is an engagement mechanism, specifically, a groove or a protrusion, which is built in the side surface of the backlight module 10 for matching with the connection structure of the control circuit board. The second connecting terminal 102 is a shrapnel pad or a conductive pad which is provided on the side surface.

Alternatively, the first connecting terminal 101 is a flexible circuit board, FPC drawn from the side surface of the backlight module 10.

The processing circuit for connecting the liquid crystal panel and the control circuit board formed on FPCA previously, is disposed on the backlight module in the embodiment of the present application, to improve the production efficiency of the processing circuit and reduce the cost, while eliminating the conventional FPCA and reducing the thickness and weight of the liquid crystal display device.

Referring to FIGS. 4 to 7, the embodiment of the liquid crystal display device of the present application includes:

A liquid crystal panel 20;

A control circuit board 30;

The backlight module 10 includes a first connecting terminal 101 provided on the backlight module 10 for connecting the liquid crystal panel 20, and a second connecting terminal 102 provided on the backlight module 10 for connecting the control circuit board 30, the processing circuit 103 is formed on one side of the backlight module 10, and connecting to the first connecting terminal 101 and the second connecting terminal 102 respectively for realizing the signal processing and the connection between the liquid crystal panel 20 and the control circuit board 30. Alternatively, the backlight module 10 further includes a back plate 104 and a plastic frame 105, the processing circuit 103 is formed on the outer side surface of the backlight module 10 opposite to the liquid crystal panel, i.e., the outer side surface of the back plate of the backlight module 10. The first connecting terminal 101 is a flexible circuit board, FPC drawn out from the side surface of the backlight module 10; the liquid crystal panel 20 includes a third connecting terminal 201 corresponding to the first connecting terminal 101; the third connecting terminal 201 is an FPC interface, and the FPC is bent and pressed together in the interface of the FPC to realize the connection of the liquid crystal panel 20 and the backlight module 10, wherein the FPC is located on the inside of the plastic frame 105, and the FPC is fixed and protected by the plastic frame 105.

Alternatively, the second connecting terminal 102 is a pad built in the side surface or is provided on the side surface of the backlight module 10; the control circuit board 30 includes a fourth connecting terminal 301 corresponding to the second connecting terminal 102. When the second connecting terminal 102 is a groove built in the side surface of the backlight module 10, the fourth connecting terminal 301 is a projection corresponding to the groove, and the second connecting terminal 102 and the fourth connecting terminal 301 are engaged with each other to realize the connection of the control circuit board 30 and the backlight module 10, wherein the second connecting terminal 102 can be a projection built in the side surface of the backlight module 10, and the fourth connecting terminal 301 is a groove corresponding to the projection. If the second connecting terminal 102 is a shrapnel pad provided on the side surface, the fourth connecting terminal 301 is a conductive pad corresponding to the shrapnel pad, and the second connecting terminal 102 is in contact with the fourth connecting terminal 301 to realize the connection of the control circuit board 30 and the backlight module 10; wherein the second connecting terminal 102 can also be a conductive pad and the fourth connecting terminal 301 is a shrapnel pad corresponding to the conductive pad.

Alternatively, the second connecting terminal 102 and the fourth connecting terminal 301 can also be other interconnected connection structures corresponding to each other.

Alternatively, the backlight module 10 emits light and to the liquid crystal panel 20; the control circuit board 30 outputs a control signal through the fourth connecting terminal 301, and the processing circuit 103 receives the control signal through the second connecting terminal 102 connected to the fourth connecting terminal 301, and after the processing of the control signal, then outputting the signal via the first connecting terminal 101, the liquid crystal panel 20 receives the control signal through the third connecting terminal 201 connected to the first connecting terminal 101, and controls the output of the light via the driving IC.

Alternatively, the liquid crystal panel 20 outputs the touching signal through the third connecting terminal 201, the processing circuit 103 receives the touching signal through the first connecting terminal 101 connected to the third connecting terminal 201, and converts the touching signal into an electrical signal, and the signal is outputted through the second connecting terminal 102, the control circuit board 30 receives the electric signal through the fourth connecting terminal 301 connected to the second connection section 102, then processes and feedbacks the electrical signal. Alternatively, the processing circuit 103 can also perform transmission of other signals such as a detection signal.

In another embodiment, the description of the backlight module 10 of the liquid crystal display device is described in detail with reference to the embodiments of the backlight module described above.

The processing circuit for connecting the liquid crystal panel and the control circuit board formed on FPCA previously, is disposed on the backlight module in the embodiment of the present application, to improve the production efficiency of the processing circuit and reduce the cost, while eliminating the conventional FPCA and reducing the thickness and weight of the liquid crystal display device.

Above are embodiments of the present application, which does not limit the scope of the present application. Any modifications, equivalent replacements or improvements within the spirit and principles of the embodiment described above should be covered by the protected scope of the invention.

What is claimed is:

1. A backlight module, comprising:
a first connecting terminal disposed on the backlight module for connecting a liquid crystal panel parallel to the backlight module;
a second connecting terminal disposed on the backlight module for connecting a control circuit board parallel to and facing the backlight module, the second connecting terminal is a pad built on a side surface of the backlight module for directly engaging the control circuit board and the backlight module to each other by a corresponding connecting terminal formed on the opposing surface of the control circuit board; wherein the backlight module is sandwiched between the liquid crystal panel and the control circuit board;
a processing circuit formed on one side of the backlight module by a 3D printing technique, to connect to the first connecting terminal and the second connecting terminal, respectively, and for realizing the signal processing and the connection between the liquid crystal panel and the control circuit board; and the second connecting terminal is a pad built in the side surface or provided on the side surface of the backlight module;
wherein the first connecting terminal, the second connecting terminal and the processing circuit are integrated into the backlight module, the liquid crystal panel and the control circuit board are independent from the backlight module.

2. The backlight module according to claim 1, wherein the first connecting terminal is a flexible circuit board, FPC drawn from the side surface of the backlight module.

3. The backlight module according to claim 1, wherein the processing circuit is formed on the outer side surface of the backlight module opposite to the liquid crystal panel.

4. The backlight module according to claim 1, further comprising a back plate, wherein the processing circuit is formed on the outer side surface of the back plate.

5. A backlight module, comprising:
a first connecting terminal disposed on the backlight module for connecting a liquid crystal panel parallel to the backlight module;
a second connecting terminal disposed on the backlight module for connecting a control circuit board parallel to and facing the backlight module, the second connecting terminal is a pad built on a side surface of the backlight module for directly engaging the control circuit board and the backlight module to each other by a corresponding connecting terminal formed on the opposing surface of the control circuit board; wherein the backlight module is sandwiched between the liquid crystal panel and the control circuit board; and
a processing circuit formed on one side of the backlight module to connect to the first connecting terminal and the second connecting terminal, respectively, and for realizing the signal processing and the connection between the liquid crystal panel and the control circuit board;
wherein the first connecting terminal, the second connecting terminal and the processing circuit are integrated into the backlight module, the liquid crystal panel and the control circuit board are independent from the backlight module.

6. The backlight module according to claim 5, wherein the processing circuit is formed on one side of the backlight module by a 3D printing technique.

7. The backlight module according to claim 5, wherein the first connecting terminal is a flexible circuit board, FPC drawn from the side surface of the backlight module.

8. The backlight module according to claim 5, wherein the processing circuit is formed on the outer side surface of the backlight module opposite to the liquid crystal panel.

9. The backlight module according to claim 5, further comprising a back plate, wherein the processing circuit is formed on the outer side surface of the back plate.

10. A liquid crystal display device, comprising:
a liquid crystal panel;
a control circuit board;
a backlight module comprising a first connecting terminal disposed on the backlight module, for connecting the liquid crystal panel parallel to the backlight module; a second connecting terminal disposed on the backlight module, for connecting the control circuit board parallel to and facing the backlight module, the second connecting terminal is a pad built on a side surface of the backlight module for directly engaging the control circuit board and the backlight module to each other by a corresponding connecting terminal formed on the opposing surface of the control circuit board, wherein the backlight module is sandwiched between the liquid crystal panel and the control circuit board; a processing circuit formed on one side of the backlight module, and connecting to the first connecting terminal and the second connecting terminal respectively, for realizing the signal processing and the connection between the liquid crystal panel and the control circuit board;
wherein the first connecting terminal, the second connecting terminal and the processing circuit are integrated into the backlight module, the liquid crystal panel and the control circuit board are independent from the backlight module.

11. The liquid crystal display device according to claim 10, wherein the processing circuit is formed on one side of the backlight module by a 3D printing technique.

12. The liquid crystal display device according to claim 10, wherein the liquid crystal display comprising a third connecting terminal corresponding to the first connecting terminal and the liquid crystal panel and the backlight module are connected via the first connecting terminal and the third connecting terminal.

13. The liquid crystal display device according to claim 10, wherein the liquid crystal display comprising a fourth connecting terminal corresponding to the second connecting terminal and the control circuit board and the backlight module are connected via the second connecting terminal and the fourth connecting terminal.

14. The liquid crystal display device according to claim 10, wherein the first connecting terminal is a flexible circuit board, FPC drawn from the side surface of the backlight module.

15. The liquid crystal display device according to claim 10, wherein the processing circuit is formed on the outer side surface of the backlight module opposite to the liquid crystal panel.

16. The liquid crystal display device according to claim 10, the backlight module further comprising a back plate, wherein the processing circuit is formed on the outer side surface of the back plate.

* * * * *